United States Patent
Klein et al.

(10) Patent No.: US 6,507,864 B1
(45) Date of Patent: Jan. 14, 2003

(54) CLIENT-SERVER SOFTWARE FOR CONTROLLING DATA COLLECTION DEVICE FROM HOST COMPUTER

(75) Inventors: John Klein, Morgan Hill, CA (US); Allan Herrod, Farmingville, NY (US); Steven Woloschin, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/520,929

(22) Filed: Mar. 8, 2000

Related U.S. Application Data

(63) Continuation of application No. 08/916,605, filed on Aug. 22, 1997, now abandoned, which is a continuation of application No. 08/691,263, filed on Aug. 2, 1996, now abandoned.

(51) Int. Cl.[7] .............................................. G06F 15/16
(52) U.S. Cl. .............................. 709/201; 710/73; 710/5
(58) Field of Search .......................... 709/201; 710/73, 710/5

(56) References Cited

U.S. PATENT DOCUMENTS

| | | | |
|---|---|---|---|
| 4,654,482 A | 3/1987 | DeAngelis | 379/95 |
| 4,841,132 A | 6/1989 | Kajitani et al. | 235/472 |
| 4,866,257 A | 9/1989 | Elliott et al. | 235/436 |
| 4,868,375 A | 9/1989 | Blanford | 235/462.25 |
| 5,288,976 A | 2/1994 | Citron et al. | 235/375 |
| 5,331,547 A | 7/1994 | Laszlo | 364/413.01 |
| 5,483,052 A | 1/1996 | Smith, III et al. | 235/472 |
| 5,490,217 A | 2/1996 | Wang et al. | 380/51 |

(List continued on next page.)

FOREIGN PATENT DOCUMENTS

| | | |
|---|---|---|
| EP | 0744856 | 11/1996 |
| JP | 63-110965 | 7/1988 |
| JP | 63-60435 | 11/1988 |
| JP | 02-064799 | 3/1990 |

OTHER PUBLICATIONS

"Distributing Uniform Resource Locators as Bar Code Images," IBM Technical Disclosure Bulletin, vol. 39, No. 1 (Jan. 1996).
Hahn, "Uniform Resource Locators," EDPACS, vol. 23, No. 6, pp. 8–13 (Dec. 1995).
Intermec, 9511 Online Reader, System Manual (1986).
InstaRead, Bar Code Scanners, Operator's Manual, Moving Beam Laser Bar Code Scanner (Jun. 1985).
Schilit et al., "TeleWeb: Loosely connected access to the World Wide Web," Computer Networks and ISDN Systems, vol. 28, No. 11, pp. 1431–1444 (May 1996).
Shrikumar et al., "Thinternet: Life at the end of a tether," Computer Networks and ISDN Systems, vol. 27, No. 3, pp. 375–385 (Dec. 1994).

*Primary Examiner*—Krisna Lim
(74) *Attorney, Agent, or Firm*—Fish & Richardson P.C.

(57) ABSTRACT

A method of integrating host application software with data collection devices (e.g., bar code scanners) located on remote, wireless terminals. A data collection object executes on the host computer, using a predetermined interface between the host application software and the data collection object. That interface, and the communications between the host application software and the data collection object, are configured so that to the host application software the data collection device appears to be local hardware on the host computer. The data collection object creates and executes threads of execution for controlling operation of the data collection device, with the threads communicating with the remote terminals via a host computer transport layer, the wireless link, and a remote computer transport layer at the remote terminals. A data collection device driver on the remote terminal receives communications from the data collection object, and returns information to the data collection object, over the remote computer transport layer, wireless link, and host computer transport layer.

8 Claims, 4 Drawing Sheets

U.S. PATENT DOCUMENTS

| | | | |
|---|---|---|---|
| 5,600,833 A | 2/1997 | Senn et al. | 395/601 |
| 5,635,694 A | 6/1997 | Tuhro | 235/375 |
| 5,640,193 A | 6/1997 | Wellner | 348/7 |
| 5,664,231 A * | 9/1997 | Postman et al. | 710/73 |
| 5,717,737 A * | 2/1998 | Doviak et al. | 455/403 |
| 5,804,803 A | 9/1998 | Cragun et al. | 235/375 |
| 5,870,088 A | 2/1999 | Washington et al. | 345/326 |
| 5,881,230 A | 3/1999 | Christensen et al. | |
| 5,905,248 A | 5/1999 | Russell et al. | 235/462 |
| 5,978,773 A | 11/1999 | Hudetz et al. | 705/23 |
| 5,987,611 A * | 11/1999 | Freund | 713/201 |
| 6,012,102 A | 1/2000 | Shachar | 710/5 |
| 6,041,374 A * | 3/2000 | Postman et al. | 710/73 |
| 6,094,689 A * | 7/2000 | Embry et al. | 710/5 |
| 6,144,848 A * | 11/2000 | Walsh et al. | 455/419 |

\* cited by examiner

CLIENT-SERVER SOFTWARE FOR CONTROLLING DATA COLLECTION DEVICE FROM HOST COMPUTER

CROSS-REFERENCE TO RELATED APPLICATIONS

This application is a continuation of U.S. patent application Ser. No. 08/916,605, filed on Aug. 22, 1997, now abandoned, which is a continuation of U.S. patent application Ser. No. 08/691,263, filed on Aug. 2, 1996, now abandoned.

BACKGROUND OF THE INVENTION

The invention relates to integrating host application software with data collection devices (e.g., bar code scanners) located on remote, wireless terminals.

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilized as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol.

Known hand-held optical readers are often in the shape of a gun having a handle portion and a barrel portion. The reading window through which the light beam passes is generally located at the end face of the barrel portion, and the reader is aimed at the indicia to be read by the operator holding the handle portion. A trigger is situated in the region of the junction between the handle portion and the barrel portion for operation by the user to actuate the optical reader.

In addition there are known portable hand-held computers for collecting data and down-loading the data to a central or peripheral device. The down-loaded data may be raw data or data that has been processed within the hand-held computer. Data collection can be carried out by entering information to the hand-held computer via a keypad, or by incorporating in the computer an optical reader for example for reading a magnetic card strip. For example when information about various products is required during inventorying, those products may bear bar code symbols or magnetic strips, or have associated magnetic strip cards which are read by the hand-held computer. The data collected can be transferred from the hand-held computer to a central or peripheral device by known means such as radio frequency radio links, wired connections, infra-red communications or other known transmission arrangements.

Often, more than one data capture system is required for a given application. The manufacture of a customized system for a specific application is expensive and difficult to modify if it is subsequently desired to incorporate further data capture options than those originally provided in the customized device.

Further limitations are imposed because of the limited storage capability of hand-held computers (often known as personal digital assistants) as a result of which simple-store-and-forward, multi-user electronic message systems are generally impractical.

It has been previously proposed to implement a bar code scanner resident on a control machine running a COMPONENT OBJECT MODEL (COM) object. It is desired to increase the scope of such applications to be compatible with a wide range of models and in particular to introduce a bar code scanner remote from the machine and controlled through a wireless interface.

SUMMARY OF THE INVENTION

In general, the invention features a new method of integrating host application software with data collection devices (e.g., bar code scanners) located on remote, wireless terminals. A data collection object executes on the host computer, using a predetermined interface between the host application software and the data collection object. That interface, and the communications between the host application software and the data collection object, are configured so that to the host application software the data collection device appears to be local hardware on the host computer. The data collection object creates and executes threads of execution for controlling operation of the data collection device, with the threads communicating with the remote terminals via a host computer transport layer, the wireless link, and a remote computer transport layer at the remote terminals. A data collection device driver on the remote terminal receives communications from the data collection object, and returns information to the data collection object, over the remote computer transport layer, wireless link, and host computer transport layer.

In preferred implementations of the invention, one or more of the following features may be included:

The data collection object may be implemented as a Component Object Model.

Communications between the remote terminal and the host computer may be over an Internet or Intranet network.

The data collection device may be a bar code scanner, and the data collection object may be a bar code scanning object.

There may be provided a portable computer device comprising a main body and at least one data collection/communications module connectable to the main body, the main body including an interface for connection with the module, a processor for processing information received from the module and a communication link for exchanging information with a host. Because of the modular arrangement the device may be easily adapted to different applications without the requirement to manufacture costly customized systems or to modify such systems which would prove expensive and complex.

The main body may include a visual display, for example an LCD display. The main body may also comprise a keypad. The modules may comprise an image capture module, a laser scanner module and/or a multi-media module. The modules preferably include digital signal processing sub-systems which may be of a single design and programmable as appropriate. The modules may comprise pre-processors for pre-processing information prior to transfer to the main body to reduce the burden on the processor in the main body. The module may be movably mounted on or relative to the main body, and in particular to the display on the main body—for example it may be hinged pivotally or rotatably mounted.

The device may be configured for connection with the Internet.

According to the invention there is provided a communication system for a bar code scanner comprising a control host, a scanning control object working therein and a remote client associated with the bar code scanner wherein the scanning control object communicates with the remote client to control the bar code scanner and the scanning control object is implemented as an OLE control. Accordingly there is provided a system capable of seamless communication between the scanning control and the remote client.

The host and the scanning object control may communicate and integrate via interfaces. The scanning control object may create separate threads of execution for controlling communication with the remote client. The separate threads of execution may include send, receive and synchronize bar code scanner transaction commands.

The scanning control object may be arranged to communicate with the remote client over an Internet or Intranet link and/or by wireless communication.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which.

DETAILED DESCRIPTION OF THE PREFERRED EMBODIMENTS

Figure 1:
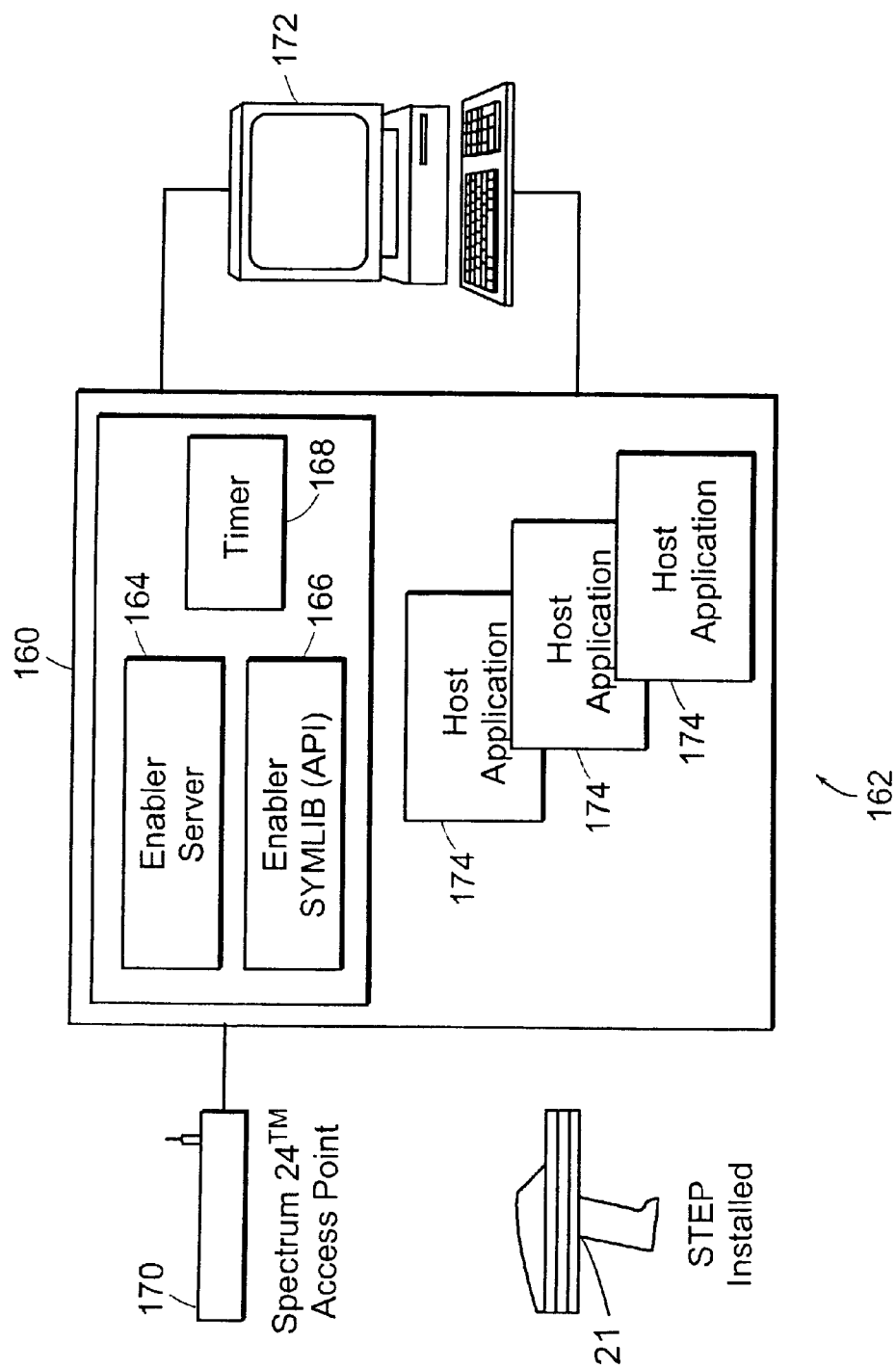
FIG. 1 illustrates a block diagram of a conventional wireless communication system with a terminal emulation program installed on the mobile units.

FIG. 1 shows a prior art symbol (a Trade Mark) terminal emulator program (STEP), which is a tool used to format applications for pen-based mobile units. The STEP resides in the mobile units 21 and works with an enabler development system 160 on a host computer 162 to execute a predefined set of commands sent from the host computer 162. The enabler development system 160 includes an enabler server 164, an enabler application program interface 166 and a timer 168. The enabler development system 160 receives input from the Spectrum24 access point unit 170. The host computer 162 is controlled by a terminal 172 to run host applications 174.

The STEP provides the mobile units 21 with the interface and logic functions necessary to communicate over the radio network, and controls all input, output and display functions at the mobile unit level, including keyboards, displays, scanners and peripherals, and printer support.

The STEP provides commands that allow the administrator to create a selection of data entry fields for the mobile unit operator. For example, these commands would permit the operator to: (a) enter data from a keyboard and scan bar codes; (b) send multiple messages to the host in the same transaction; and (c) control the type of data entered and validate entered data. Further, for display purposes STEP allows the administrator to (a) display data at any location on the mobile unit screen; (b) clear the entire mobile unit screen or clear a single line; (c) save and restore the mobile unit screen; and (d) control the backlighting feature to view the screen in the dark.

The STEP acts as a power manager to reduce demands on the batteries in the mobile units 21, enabling them to operate longer between charges and extending their overall life.

By installing STEP on the mobile units 21, forms can be created and displayed on a display screen. Forms can include messages, prompts and data entry fields. This permits an operator to recall a stored form for execution on the mobile unit 21; repeat the execution of a stored form for on-line batch processing; and erase all stored forms and determine the date and time of the last form definition.

The STEP enabled mobile units 21 allow the host computer 162 to read data files stored in the unit 21; sound the mobile unit's 21 alarm; interrupt mobile unit 21 input activity; and log off the mobile unit 21 from the host computer 162. This allows the operator to use the mobile unit 21 to collect data without being logged on to the host computer 162; set and save system parameters; download files from the host computer 162 to the memory in the mobile unit 21; and perform other maintenance tasks.

Figure 2:
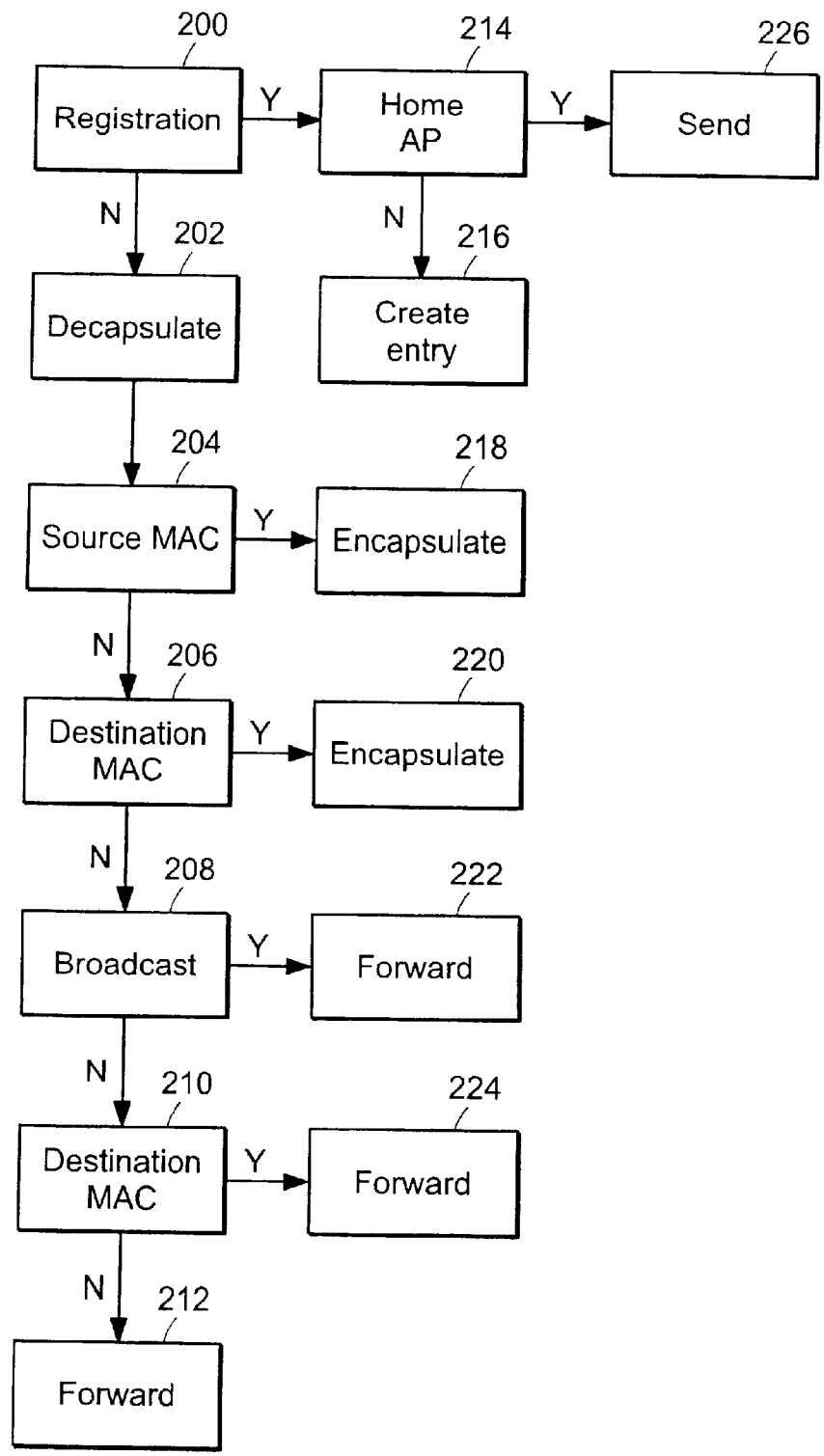
FIG. 2 illustrates a flow chart illustrating an access point's action upon receiving a packet from a mobile unit according to the prior art.

FIG. 2 illustrates a typical conventional flow chart of the actions taken by the access point 170 when it receives a packet of data from the mobile unit 21 on the wireless network. If the packet is a registration packet, determined at step 200, then the access point 170 processes the information carried by the packet at step 214. The type of association is determined by examining the IP address of the mobile unit's 21 home access point and does the control message exchanges accordingly at steps 216 and 226. If the packet is not a registration packet, as determined by step 200, then the packet is decapsulated at step 202.

If the short term address mapping tables (ST-AMT) of the access point 170 has an entry for the packet's source MAC address, determined at step 204, then the packet has originated from the mobile unit 21 that is away from its home stationary data link (SDL) network and processing passes to step 218. At step 218 the access point 170 encapsulates the packet within a UDP packet with the IP destination address set to that of the mobile unit's 21 home access point.

If the long term address mapping tables (LT-AMT) of the access point 170 has an entry for the packet's destination MAC address, determined at step 206 then the packet is meant for a mobile unit that is currently outside its home access point group (APG) and processing proceeds to step 220. At step 220 the access point 170 encapsulates the packet within an UDP packet with the IP destination address set to the destination mobile unit's local access point.

If the packet's destination MAC address is a broadcast address, determined at step 208, then the packet if forwarded at step 222 on its wired and wireless interfaces. If the destination MAC address in the packet appears in the access point's mobile host table (MHT), determined at step 210, then the packet is encapsulated within a wireless link layer packet and forwarded on the wireless interface at step 224. Otherwise, the packet is forwarded on its wired interface at step 212.

According to the invention there is provided a bar code scanning OLE (Object Linking and Embedding) COM (Component Object Model) object for communicating commands and bar code data over a wireless link. As discussed in more detail below the object uses OLE automation to be a "plug-in" development OLE control extension. It thus becomes an in-process OLE automation object. The in-process OLE automation object controls a bar code scanning device over a wireless link on a remote client. The remote device enables a bar code reader and collects the bar code information, returning the data over the wireless link to the OLE automation object.

The general principles of OLE architecture will be well known to the skilled man. In the present embodiment, a scanning object is implemented as an OLE control. OLE controls are re-useable software components designed to work in containers that support OLE 2.0. OLE controls are more powerful and more flexible than previous systems such as VBX Custom Controls in particular as, unlike the VBX Custom Controls that they are replacing OLE controls support 32 bit environments and are not limited to Microsoft Visual Basic (Trade Marks).

OLE controls are designed to work in any container that supports OLE 2.0 including not only Visual Basic 4.0 and beyond but also OLE-enabled container applications such as Microsoft Office (Trade Mark). Additionally OLE controls work in third-party OLE-enabled applications in development tools.

OLE architecture enables different software objects to communicate to each other using binary interface mechanism. This allows software objects to be developed separate from each other and bind very late at run time. The software interface is a contract between the container and the control on how the two software objects will interact and exchange information.

Figure 3:
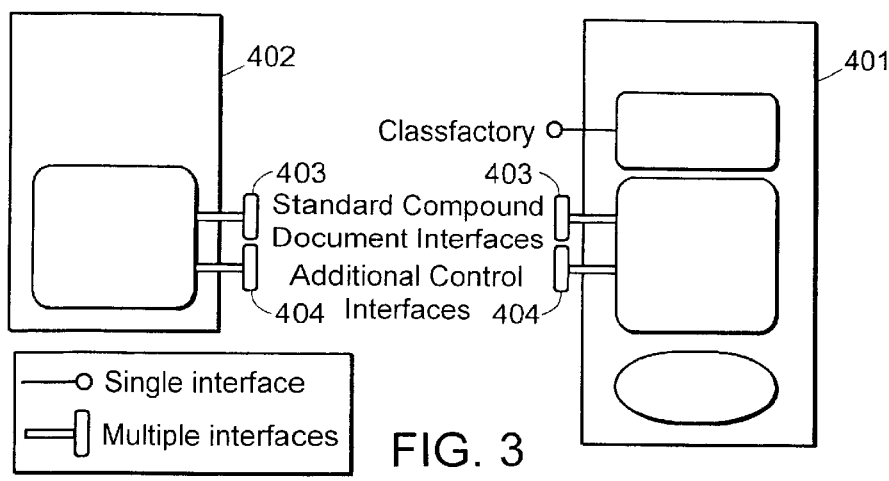
FIG. 3 shows the interface between a scanning control and a control container according to the invention.

Under the OLE architecture, the scanning object can be placed and activated in any of is a variety of containers that support the OLE container interface. FIG. 3 shows the general mechanism between a control 401 and its container 402. As can be seen the mechanism includes standard compound document interfaces 403 and additional control interfaces 404, each comprising multiple interfaces.

In such a system the scanning control appears to become a seamless part of the container's environment. Through the exposed interfaces the two objects communicate and integrate with each other.

Figure 4:
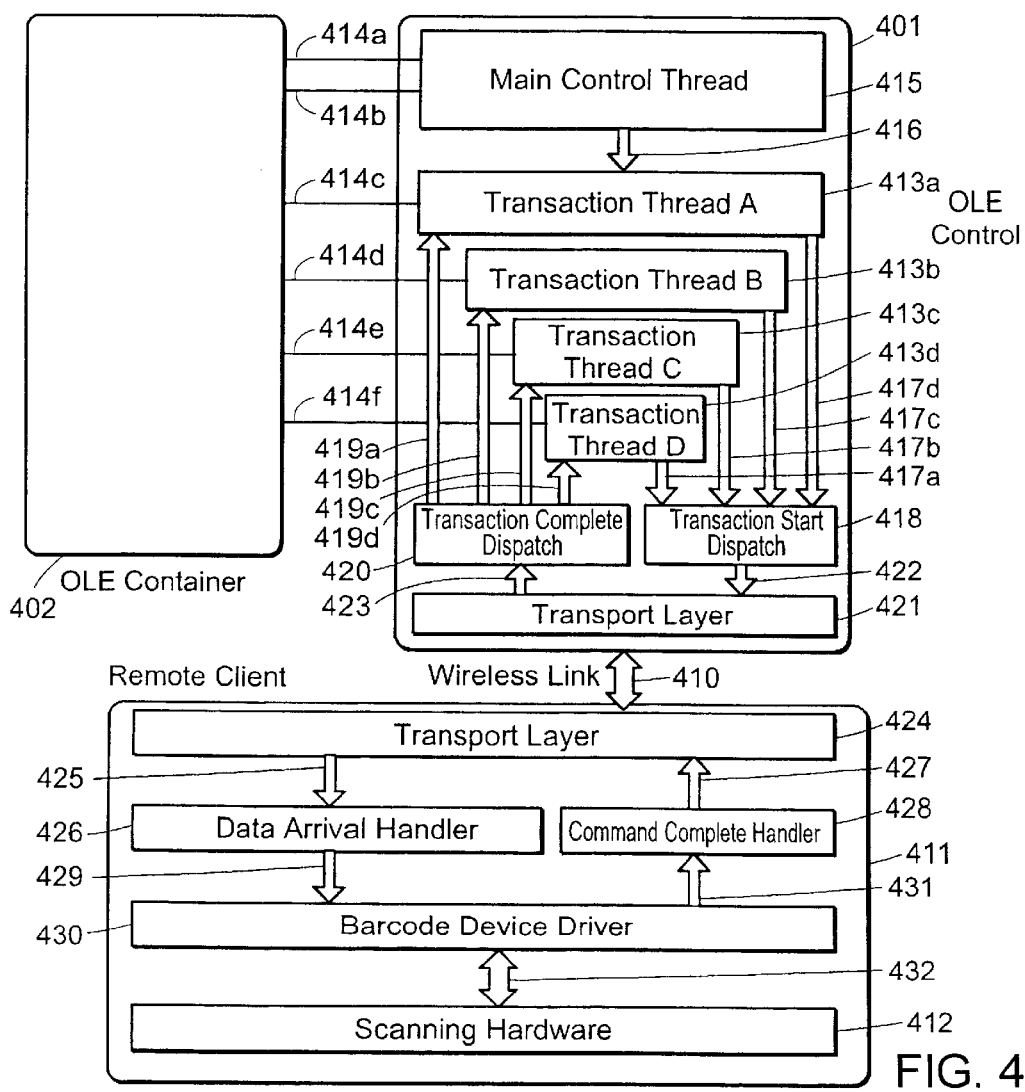
FIG. 4 shows multiple threads of execution maintained by the control of FIG. 3.

In addition, as shown in FIG. 4, the scanning control 401 communicates over a wireless link 410 with a remote computing client 411 to control the bar code reading device 412. The scanning control 401 sends commands over the wireless link 410 by creating separate threads of execution 413a to 413d that send, receive and synchronize bar code reader transactions over the wireless link. As shown in FIG. 4, the OLE container 402 and control 401 communicate via lines 414a to 414f. The OLE control includes a main control thread 415 which communicates with the OLE container 401 via lines 414a, 414b and with a first transaction thread A 413a via a line 416. Each of the transaction threads 413a to 413d communicate along a respective line 414c to 414f with the OLE container 402. Each of the threads also outputs through a respective first line 417a to 417d to a transaction start dispatch function 418 and receives an input via a respective second line 419a to 419d from a transaction complete dispatch function 420. The transaction start dispatch function 418 communicates with a transport layer 421 in the remote client 411 via a line 422 and a transaction complete dispatch function 420 receives input from the transport layer 421 via a line 423. The remote client 411 includes a corresponding transport layer 424 which outputs via a line 425 to a data arrival handler 426 and receives an input via line 427 from a command complete handler 428. The data arrival handler 426 outputs via line 429 to a bar code device driver 430 and the command complete handler receives an input 431 from the bar code device driver 430. The bar code device driver 430 communicates with the scanning hardware such as a bar code reader 412 via a line 432.

As a result users can develop applications using OLE-enabled development tools like Visual Basic 4.0. The user simply inserts a new scanning object into their project, sets required properties, writes necessary code for event notification and the scanning control seamlessly talks to the remote client bar code scanning device over the wireless link. To the application program it appears as if the scanning device is resident on its local hardware. The invention comprises a significant development over previous architectures comprising implementation of a local bar code scanner resident on a machine running a COM object. In particular the architecture of the invention allows control of the scanner through the wireless interface.

Figure 5:
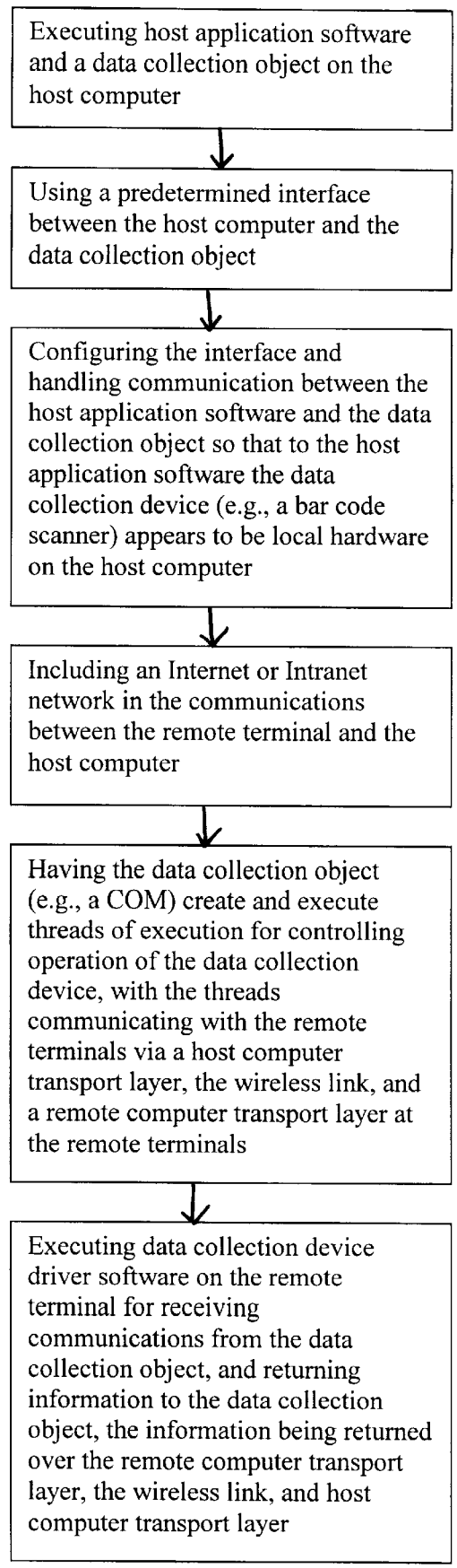
FIG. 5 shows the process performed by the invention.

FIG. 5 shows the steps of the process of the invention.

By virtue of the present invention there is in addition the capability of supporting future versions to be distributed via the distributed component object model architecture (DCOM). The interfaces between the control container and the control itself are binary and can be implemented by the operating system as Remote Procedure Calls (RPC's). Accordingly the OLE control can be implemented as an Active-X control to control devices over an Internet or Intranet link. This technology allows Web authors and developers to create a new generation of interactive Web pager and applications, for example Microsoft Internet Explorer 3.0 (Trade Mark). This implementation is of particular benefit in proposed systems whereby users will wish to integrate bar code scanning capabilities into their Intranet/Internet-enabled applications.

Many other embodiments of the invention are within the scope of the following claims:

What is claimed is:

1. A method of integrating host application software with data collection devices located on remote, wireless terminals, the method comprising executing the host application software and a data collection object on the host computer, using a predetermined interface between the host application software and the data collection object;

configuring the interface and handling communication between the host application software and the data collection object so that to the host application software the data collection device appears to be local hardware on the host computer;

the data collection object creating and executing threads of execution for controlling operation of the data collection device, with the threads communicating with the remote terminals via a host computer transport layer, the wireless link, and a remote computer transport layer at the remote terminals; and executing data collection device driver software on the remote terminal for receiving communications from the data collection object, and returning information to the data collection object, the information being returned to the data collection object over the remote computer transport layer, wireless link, and host computer transport layer.

2. The method of claim 1, wherein the data collection object is implemented as a Component Object Model.

3. The method of claim 2, wherein communications between the remote terminal and the host computer are over an Internet or Intranet network.

4. The method of claim 3, wherein the data collection device is a bar code scanner, and the data collection object is a bar code scanning object.

5. Software resident on a computer readable medium for integrating host application software with data collection devices located on remote, wireless terminals, the software comprising instructions for executing the host application software and a data collection object on the host computer, using a predetermined interface between the host application software and the data collection object;

configuring the interface and handling communication between the host application software and the data collection object so that to the host application software the data collection device appears to be local hardware on the host computer, the data collection object creating and executing threads of execution for controlling operation of the data collection device, with the threads communicating with the remote terminals via a host computer transport layer, the wireless link, and a remote computer transport layer at the remote terminals; and executing data collection device driver software on the remote terminal for receiving communications from the data collection object, and returning information to the data collection object, the information being returned to the data collection object over the remote computer transport layer, wireless link, and host computer transport layer.

6. The software of claim 5, wherein the data collection object is implemented as a Component Object Model.

7. The software of claim 6, wherein communications between the remote terminal and the host computer are over an Internet or Intranet network.

8. The software of claim 5, wherein the data collection device is a bar code scanner, and the data collection object is a bar code scanning object.

* * * * *